(12) United States Patent
Yeo et al.

(10) Patent No.: US 12,626,485 B2
(45) Date of Patent: May 12, 2026

(54) APPARATUS AND METHOD FOR RECOGNIZING OBJECT

(71) Applicant: ELECTRONICS AND TELECOMMUNICATIONS RESEARCH INSTITUTE, Daejeon (KR)

(72) Inventors: Geon Min Yeo, Daejeon (KR); Young Il Kim, Daejeon (KR); Seong Hee Park, Daejeon (KR); Wun Cheol Jeong, Daejeon (KR); Tae Wook Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 776 days.

(21) Appl. No.: 18/079,983

(22) Filed: Dec. 13, 2022

(65) Prior Publication Data

US 2023/0186604 A1 Jun. 15, 2023

(30) Foreign Application Priority Data

Dec. 14, 2021 (KR) ........................ 10-2021-0179118
Dec. 9, 2022 (KR) ........................ 10-2022-0172036

(51) Int. Cl.
| | |
|---|---|
| *G06V 10/764* | (2022.01) |
| *G06V 10/26* | (2022.01) |
| *G06V 10/762* | (2022.01) |
| *G06V 10/77* | (2022.01) |

(52) U.S. Cl.
CPC .......... *G06V 10/764* (2022.01); *G06V 10/267* (2022.01); *G06V 10/762* (2022.01); *G06V 10/7715* (2022.01)

(58) Field of Classification Search
CPC ............... G06V 10/764; G06V 10/762; G06V 10/7715; G06V 10/267
See application file for complete search history.

(56) References Cited

U.S. PATENT DOCUMENTS

| | | | |
|---|---|---|---|
| 2011/0164823 A1 | 7/2011 | Park et al. | |
| 2014/0022394 A1 | 1/2014 | Bae et al. | |
| 2014/0099030 A1 | 4/2014 | Kim et al. | |
| 2018/0129881 A1 | 5/2018 | Seeber et al. | |

(Continued)

FOREIGN PATENT DOCUMENTS

| | | |
|---|---|---|
| JP | 2012-063280 A | 3/2012 |
| KR | 10-2014-0013407 A | 2/2014 |

(Continued)

*Primary Examiner* — David Perlman
(74) *Attorney, Agent, or Firm* — LRK PATENT LAW FIRM

(57) ABSTRACT

Provided is an apparatus for recognizing an object that includes an object inference module configured to process an original image captured by a camera module and generate an image of a size to be input to a machine learning inference model, wherein the object inference module includes the machine learning inference model, and outputs a result of recognition and classification of an object inferred through the machine learning inference model, and the machine learning inference model processes an input image to infer an object included in the input image.

20 Claims, 13 Drawing Sheets

(56)            References Cited

U.S. PATENT DOCUMENTS

2019/0213420 A1*   7/2019   Karyodisa ............. G06V 20/41
2019/0228269 A1*   7/2019   Brent ..................... G06N 3/094
2021/0350570 A1    11/2021  Hibi et al.
2022/0198788 A1*   6/2022   Patel ..................... G06V 10/26

FOREIGN PATENT DOCUMENTS

KR          10-2069694  B1    1/2020
KR      10-2020-0075628  A    6/2020
KR          10-2261187  B1    6/2021

* cited by examiner

FIG. 10

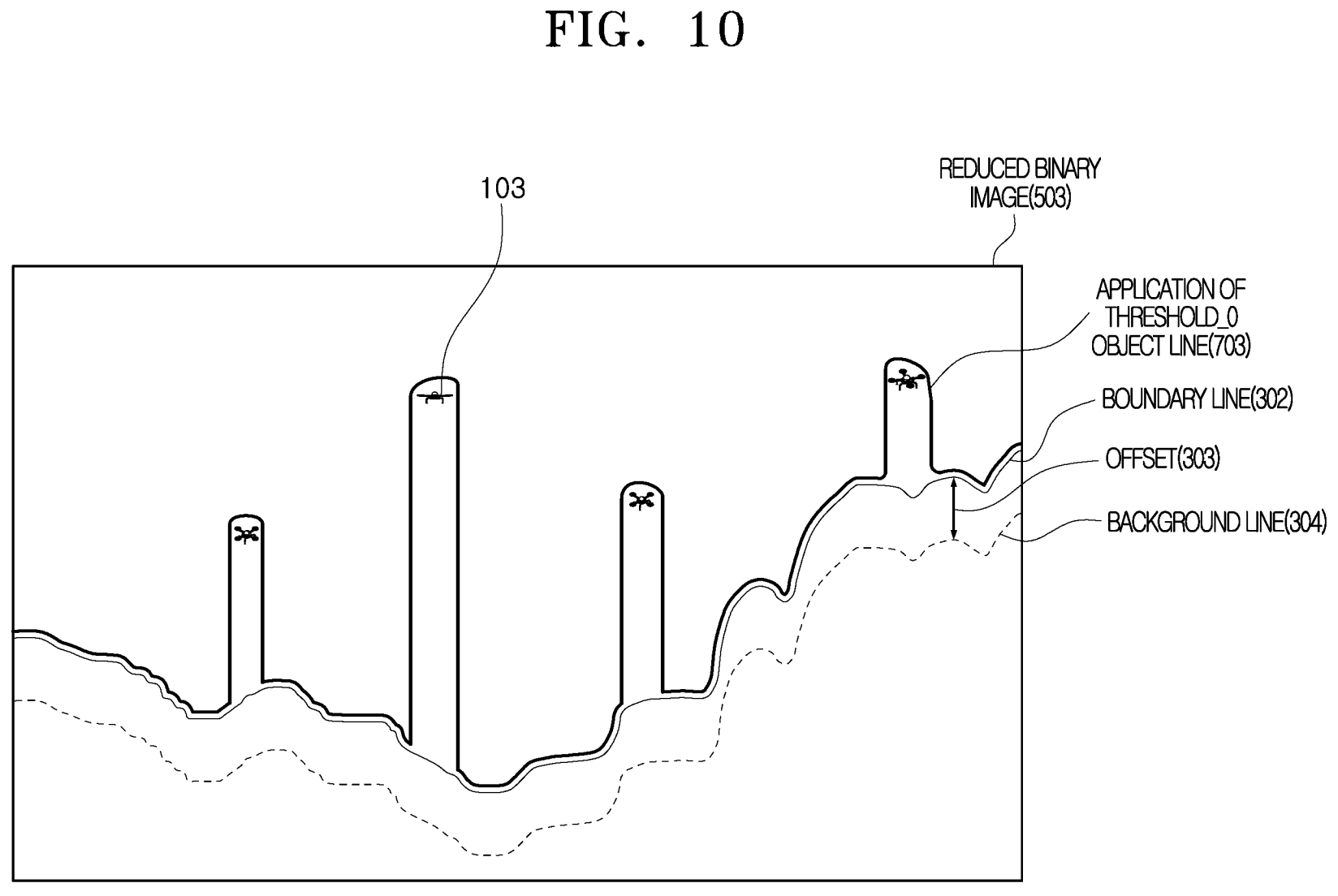

REDUCED BINARY IMAGE(503)

APPLICATION OF THRESHOLD_0
OBJECT LINE(703)

BOUNDARY LINE(302)

OFFSET(303)

BACKGROUND LINE(304)

Figure 12:
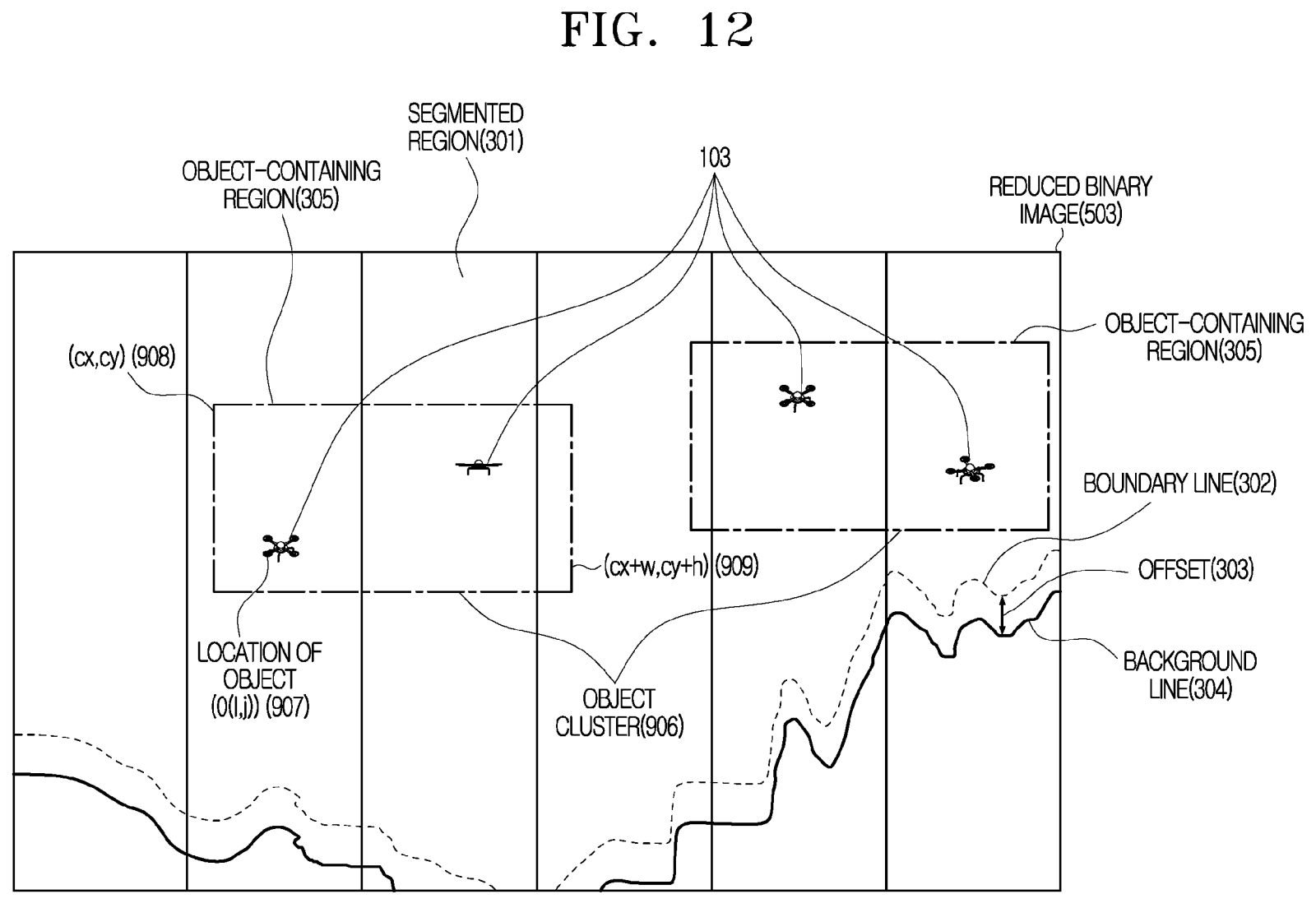

REDUCED BINARY IMAGE(503)

OBJECT-CONTAINING REGION(305)

BOUNDARY LINE(302)

OFFSET(303)

BACKGROUND LINE(304)

103

(cx+w,cy+h) (909)

OBJECT CLUSTER(906)

SEGMENTED REGION(301)

OBJECT-CONTAINING REGION(305)

(cx,cy) (908)

LOCATION OF OBJECT (O(i,j)) (907)

APPARATUS AND METHOD FOR RECOGNIZING OBJECT

CROSS-REFERENCE TO RELATED APPLICATIONS

This application claims priorities to and the benefits of Korean Patent Application No. 10-2021-0179118, filed on Dec. 14, 2021, and Korean Patent Application No. 10-2022-0172036, filed on Dec. 9, 2022, the disclosures of which are incorporated herein by reference in its entirety.

BACKGROUND

1. Field of the Invention

The present invention relates to an apparatus and method for recognizing an object, and more specifically, to an apparatus and method for recognizing an object that are capable of improving the accuracy and speed of inference in object recognition and classification.

2. Description of Related Art

In general, machine learning is an algorithm used for a computer to perform learning and prediction based on data input by a user. In other words, machine learning is a technology of recognizing the hierarchical structure and certain patterns of related entities to internally judge and determine information that has not been input, and predicting situations that will occur in the future.

In machine learning, learning is performed in several types, one of which is supervised learning, which is an algorithm for assigning a result value to each piece of data used for training to classify a model. In addition, another type of machine learning is unsupervised learning, which is an algorithm that searches for commonalities in training data that is not separately assigned result values and groups the training data. In addition, another type of machine learning is reinforcement learning, which is an algorithm for providing compensation according to actions taken in different situations without separately preparing training data.

Machine learning is used in various fields, such as games, vehicles, robots, and the like.

The background art of the present invention is disclosed in Korean Registered Patent No. 10-2261187 (registered on May 31, 2021, a system and method for machine-learning-based surveillance video analysis).

SUMMARY OF THE INVENTION

The present invention is directed to providing an apparatus and method for recognizing an object that are capable of improving accuracy and inference speed in object recognition and classification.

The technical objectives of the present invention are not limited to the above, and other objectives may become apparent to those of ordinary skill in the art based on the following descriptions.

According to an aspect of the present invention, there is provided an apparatus for recognizing an object that includes an object inference module configured to process an original image captured by a camera module and generate an image of a size to be input to a machine learning inference model, wherein the object inference module includes the machine learning inference model, and outputs a result of recognition and classification of an object inferred through the machine learning inference model, and the machine learning inference model processes an input image to infer an object included in the input image.

The object inference module may extract, as an image to be input to the machine learning inference model, an image of object-containing regions clustered in the original image according to the size to be input to the machine learning inference model The object interference module may, in order to extract the object-containing region, calculate a background line from a binary image obtained by reducing the original image, add an offset toward a sky space above the background line to calculate a boundary line, and extract an object-containing region only from the sky space except for a region below the boundary line The object inference module may convert a color image, which is the original image, into a gray image in which R, G, and B values are the same, and reduce the gray image to generate a reduced binary image, wherein the binary image is an image in which a pixel value greater than or equal to a designated threshold value is represented as 1 and a pixel value smaller than the designated threshold value is represented as 0.

The object inference module may use different threshold values to calculate N background lines, and obtain a weighting average of the N background lines assigned different weights ($W_k$) to calculate a final background line ($B_i$).

The object inference module may calculate an object line for detecting an object in the reduced binary image, and repeatedly perform a process of searching for a first vertical pixel index ($OBJ_{i,o}$) at which a vertical pixel value with respect to a horizontal pixel (i) of the binary image is minimum based on an object line calculation threshold (THRESHOLD_O) designated to calculate the object line so as to detect the object line.

The object inference module may independently detect objects in a plurality of segmented regions obtained by dividing the reduced binary image in a horizontal direction, wherein a point at which a gradient of the object line maximally increases beyond an object detection threshold (THRESHOLD_OBJECT) may be detected as a location of an object.

The object inference module may, upon the locations of the objects being detected in the reduced binary image, cluster object-containing regions according to the size to be input to the machine learning inference model, wherein the clustering may be performed with a smallest number of combinations of the object-containing regions in the corresponding image.

The object inference module may apply a specified ratio to the object-containing region clustered in the reduced binary image so as to map the clustered object-containing region to an object-containing region of the original image.

According to an aspect of the present invention, there is provided a method of recognizing an object that includes receiving, by an object inference module, an original image; processing, by the object inference module, the original image to extract at least one object-containing region according to a size to be input to a machine learning inference model, and performing, by the object inference module, recognition and classification of an object included in the at least one object-containing region using the machine learning inference module, and outputting a result of the recognition and classification of the object.

The extracting of the at least one object-containing region according to the size to be input to the machine learning inference model may include converting, by the object inference module, the original image to generate a reduced binary image; clustering, by the object inference module, at least one object-containing region based on an object detected from the reduced binary image; and mapping, by the object inference module, the object-containing region clustered in the reduced binary image to an object-containing region in the original image, to extract an object-containing region that is to be input to the machine learning inference model.

The method may further include, in order to extract the at least one object-containing region in the reduced binary image: calculating, by the object interference module, a background line from the reduced binary image, adding an offset toward a sky space above the background line to calculate a boundary line; and extracting an object-containing region only from the sky space except for a region below the boundary line.

The method may further include, in order to extract the at least one object-containing region in the reduced binary image, dividing the reduced binary image into a plurality of segmented regions in a horizontal direction; and independently detecting an object from the plurality of segmented regions to reduce an overall inference time.

According to an aspect of the present invention, there is provided a method of recognizing an object that includes reducing, by an object inference module, an original image to generate a reduced image; converting, by the object inference module, the reduced image into a binary image to generate a reduced binary image, detecting, by the object inference module, an object in the reduced binary image, and clustering object-containing regions according to a size to be input to a machine learning inference module, mapping, by the object inference module, the object-containing regions clustered in the reduced binary image to object-containing regions in the original image, and inputting, by the object inference module, the object-containing regions mapped to the original image, to infer an object.

The method may further include, in order to extract the object-containing region: calculating, by the object interference module, a background line from the reduced binary image, adding an offset toward a sky space above the background line to calculate a boundary line; and extracting, by the object interference module, an object-containing region only from the sky space except for a region below the boundary line.

The generating of the reduced binary image may include converting, by the object inference module, a color image, which is the original image, into a gray image in which R, G, and B values are the same, and reducing the gray image to generate a reduced image, and representing, by the object inference module, 0 when a pixel value is greater than or equal to a designated threshold value and representing 1 when a pixel value is smaller than the designated threshold value, to generate a binary image.

The method may further include, in order to calculate the background line, using, by the object inference module, different threshold values to calculate N background lines, and obtaining a weighting average of the N background lines assigned different weights ($W_k$) to calculate a final background line ($B_i$).

The method may further include calculating, by the object inference module, an object line for detecting an object in the reduced binary image, and detecting, by the object inference module, a point at which a gradient of the object line maximally increases beyond an object detection threshold (THRESHOLD_OBJECT) as a location of an object.

The method may further include, in order to calculate the object line, repeatedly performing, by the object inference module, a process of searching for a first vertical pixel index ($OBJ_{i,O}$) at which a vertical pixel value with respect to a horizontal pixel (i) of the reduced binary image is a minimum based on a designated object line calculation threshold (THRESHOLD_O) so as to detect the object line.

The mapping of the object-containing region clustered in the reduced binary image to the object-containing region in the original image may include applying, by the object inference module, a designated ratio to the object-containing region clustered in the reduced binary image to map the clustered object-containing region to an object-containing region of the original image.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 10 is an exemplary view for describing a method of detecting an object in the reduced binary image in FIG. 8;

FIG. 12 is an exemplary view for describing a method of clustering object-containing regions in the reduced binary image shown in FIG. 11.

DETAILED DESCRIPTION OF EXEMPLARY EMBODIMENTS

Figure 1:
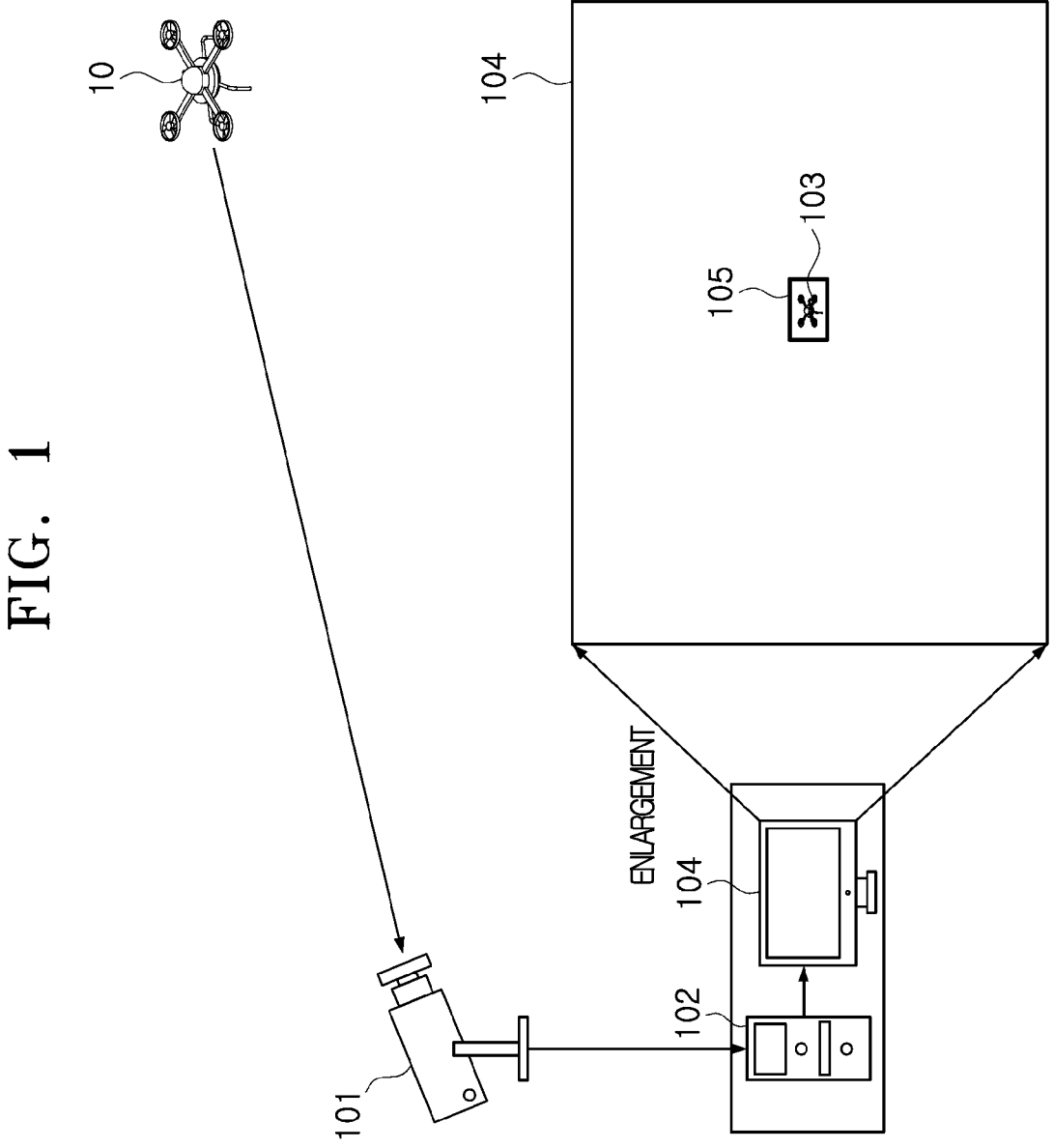
FIG. 1 is an exemplary view illustrating a schematic configuration of an apparatus for recognizing an object according to an embodiment of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, an apparatus and method for recognizing an object according to the present invention will be described in detail with reference to the accompanying drawings. The thickness of each line or the size of each component shown in the drawings may be exaggerated for the purposes of clarity and convenience. Although terms used herein are selected from among general terms that are currently and widely used in consideration of functions in the exemplary embodiments, these may be changed according to intentions or customs of those skilled in the art or the advent of new technology. Therefore, the meanings of the terms used herein should be interpreted based on substantial meanings of the terms and content of this entire specification, rather than simply the terms themselves.

Recently, with improvements in processing speed of graphic cards and evolution of machine learning, a technology of recognizing an object (e.g., a vehicle, a human, an animal, etc.) in an image captured by a camera has greatly improved.

On the other hand, in the field of defense, the technology of recognizing an object in an image has recently been employed, with a technology of recognizing the appearance of drones at an early stage to respond to drone attacks emerging, and the technology of recognizing the appearance of drones at an early stage is considered a very important technology in terms of privacy protection of private sectors.

In this case, the technology of recognizing an object in an image is implemented through machine learning for determining what is the target (i.e., an object) to be recognized on a screen and in what region the object is located. The machine learning for recognizing an object in an image is performed through image learning of various screens, and the performance is greatly influenced by high-quality learning methods.

FIG. 1 is an exemplary view illustrating a schematic configuration of an apparatus for recognizing an object according to an embodiment of the present invention, and a method of detecting a drone (an unmanned aerial vehicle: UAV) and determining the type of the drone will be illustrated below.

Referring to FIG. 1, the apparatus for recognizing an object according to the present embodiment includes a camera module 101, an object inference module 102, and an image output module 104.

The camera module 101 captures an image of an object 10 in a space.

The object inference module 102 determines the type of the object 10 (i.e., classifies the object) included in the image captured by the camera module 101 and determines a location of the object on the image output module 104 (i.e., on a screen) in which the object 10 is located (e.g., displays a bounding box).

Figure 3:
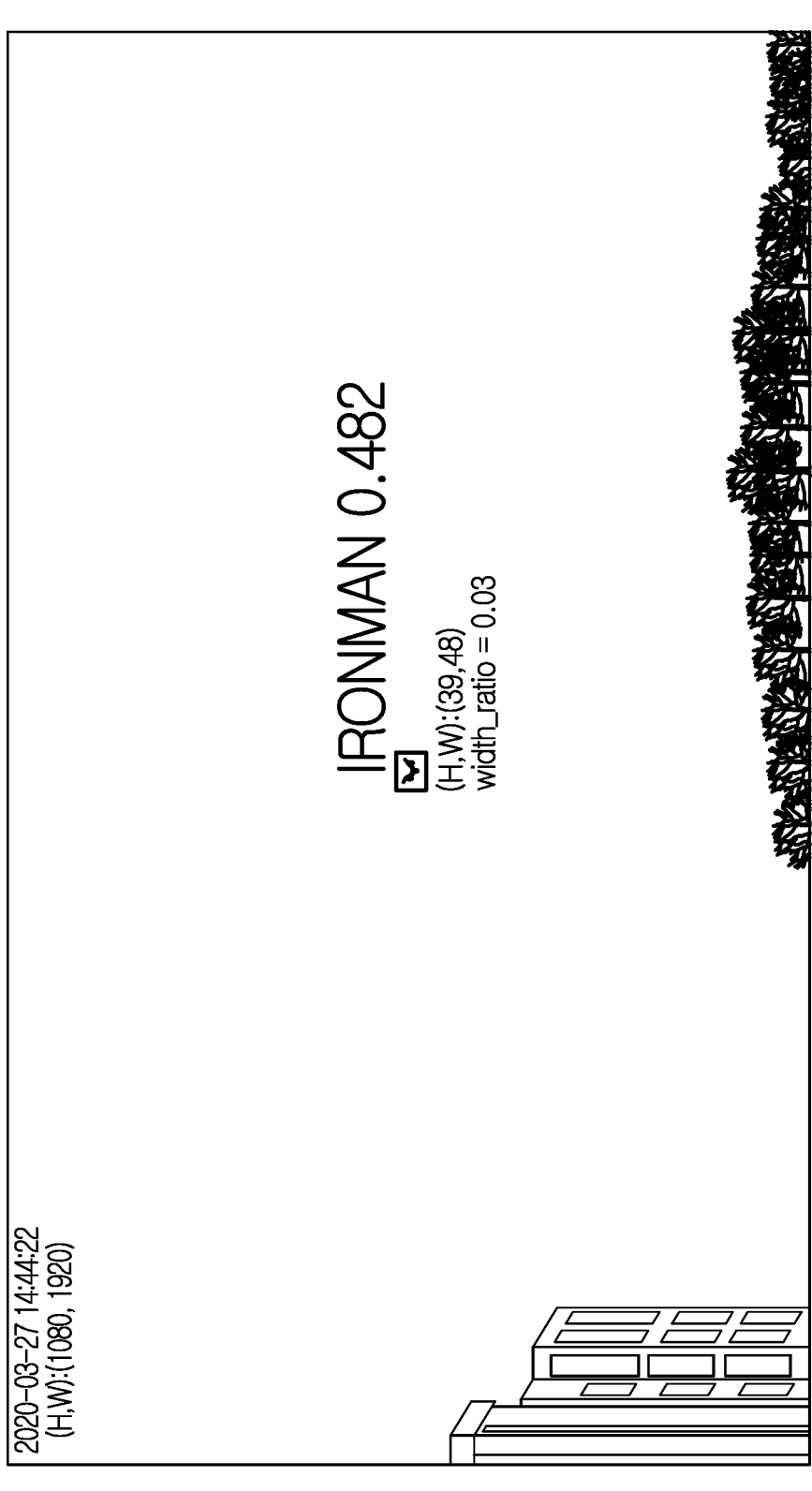
FIG. 3 is an exemplary view illustrating a recognition error image of an object when the size of the object is small in the process of classifying objects shown in FIG. 2.

The image output module 104 displays the type of the object 10 classified by the object inference module 102 and a location 105 (i.e., a bounding box) of the object on the screen (see FIG. 3). That is, the image output module 104 has a concept including a screen.

In this case, an object 103 (i.e., an object image) displayed on the image output module 104 (i.e., on the screen) represents the form of an image of a real object 10 in the space captured by the camera module 101 that is output on the screen (i.e., an object image).

In addition, a bounding box 105 is displayed at a perimeter of the object 103 (i.e., an object image) displayed on the screen of the image output module 104.

Figure 2:
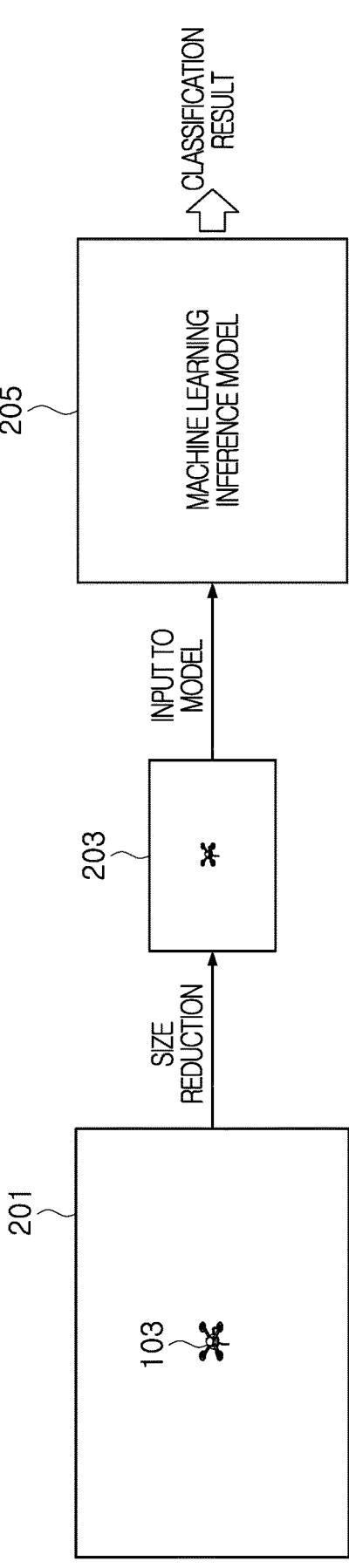
FIG. 2 is an exemplary view for describing a problem that may occur in a process of classifying objects included in an image captured through a camera module shown in FIG. 1 using machine learning.

FIG. 2 is an exemplary view for describing a problem that may occur in a process of classifying objects included in an image captured through a camera module shown in FIG. 1 using machine learning, and FIG. 3 is an exemplary view illustrating a recognition error image of an object when the size of the object is small in the process of classifying objects shown in FIG. 2.

Referring to FIG. 2, since the size of an image input to a machine learning model 205 (or a machine learning inference model) is limited, the object inference module 102 reduces the size of an original image 201 to match the size that is inputtable to the machine learning model 205 (or the machine learning inference model), and inputs a reduced image 203 obtained by reducing the size of the original image 201 to the machine learning inference model 205.

Here, the machine learning inference model 205 is a model for inferring an object using machine learning, and the object inference module 102 may include the machine learning inference model 205.

However, when the size of the original image 201 is reduced as described above, an amount of information is lost, and in particular, when an image of a high resolution (e.g., 4K, FHD, etc.) is reduced, image degradation is more severe.

For example, when the size of an image is reduced as described above, the size of an object in the corresponding image is also reduced, and the accuracy of object detection and classification is significantly lowered. For example, referring to FIG. 3, the type of an object (e.g., the drone model) in a bounding box of an image is described as "IRONMAN (i.e., a known model name of a drone)," but in practice, is incorrectly determined, and an accuracy of "0.482" is displayed, and it can be seen that the accuracy is very low. In addition, in order to recognize a small object by machine learning, the size of a minimum learning object of the learning model needs to be reduced, which takes a relatively long learning time compared to learning a large object, thereby increasing the final inference time compared to when inferring large objects.

In other words, in order to recognize an object in real time from an image captured by the camera module 101, an inference time is a very important factor in addition to accuracy. That is, there is a need for a rapid inference in order to detect the appearance of an object within a short period of time and rapidly identify the type of the detected object.

However, as described above, in the case of classifying an object using machine learning, the accuracy of object recognition and classification may be lowered in a process of reducing the size of the image according to the size that is inputtable to the machine learning model (or the machine learning inference model, and the inference time may also be increased (i.e., the inference speed is decreased).

Therefore, the apparatus for recognizing an object according to the present embodiment provides a method of improving the accuracy of object recognition and classification, and also reducing the inference time (i.e., increasing the inference speed).

Figure 4:
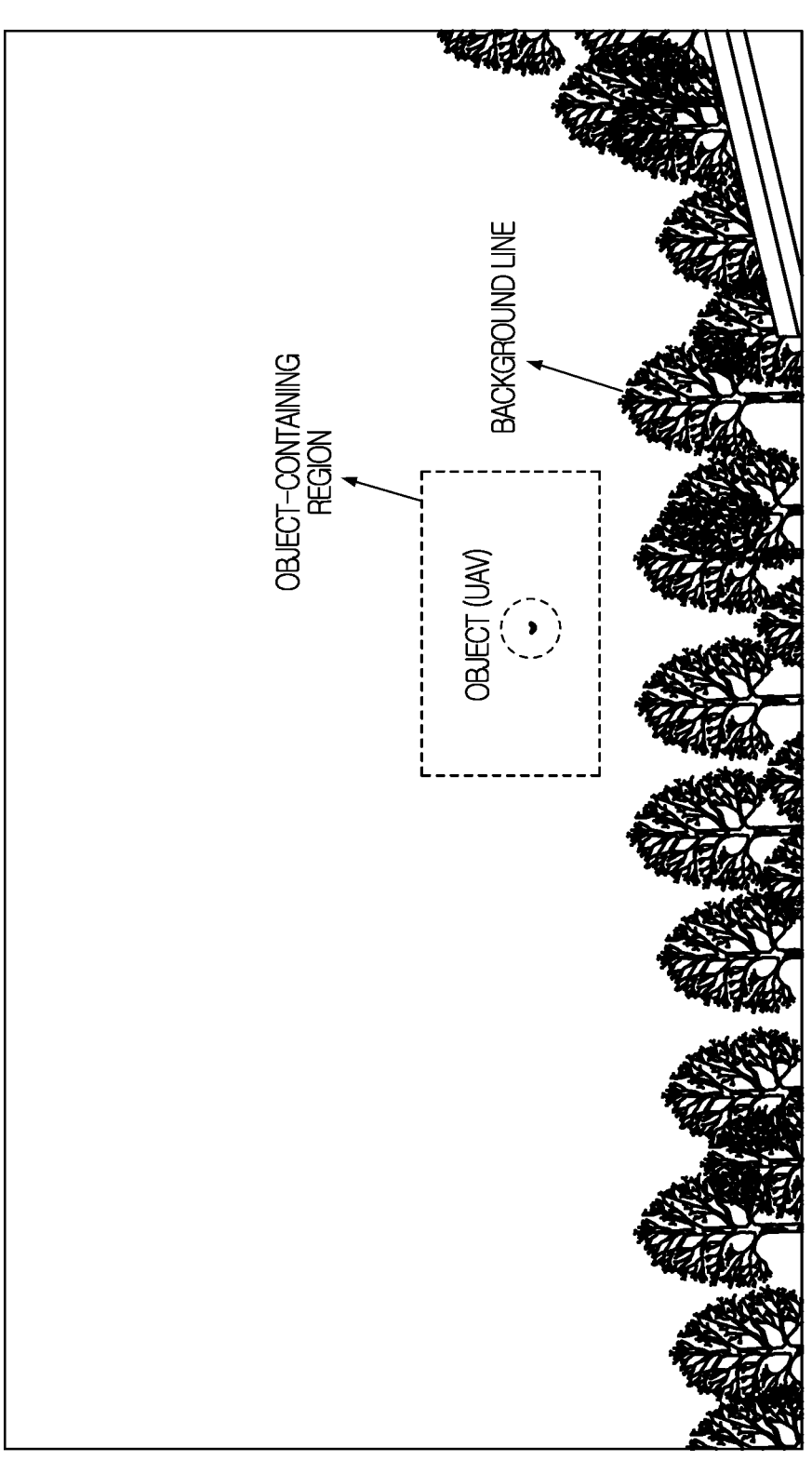
FIG. 4 is an exemplary view for schematically describing a method of increasing the size of an object to be input to a machine learning model in order to improve the accuracy and inference speed in object recognition and classification according to an embodiment of the present invention.
Figure 5:
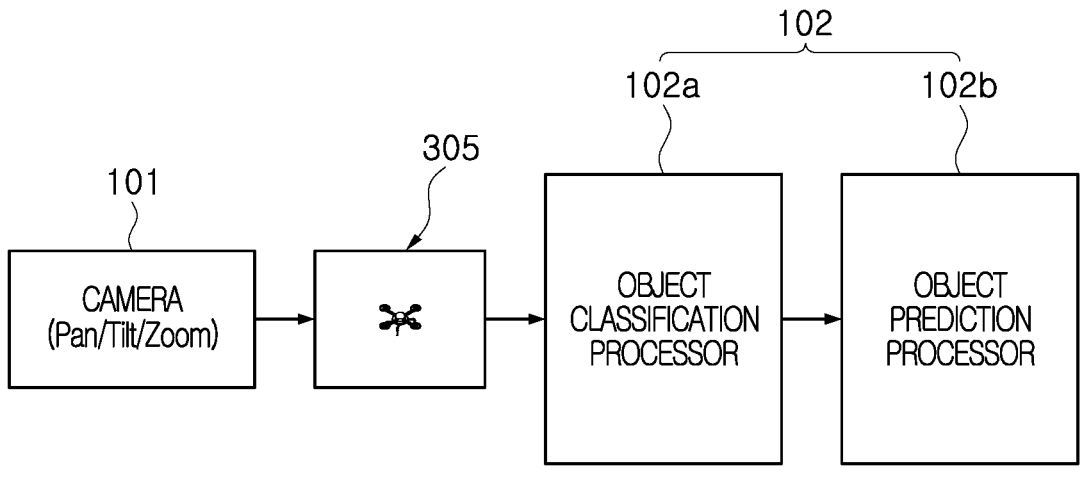
FIG. 5 is an exemplary view illustrating a more detailed configuration of an object inference module shown in FIG. 1.

FIG. 4 is an exemplary view for schematically describing a method of increasing the size of an object to be input to a machine learning model in order to improve the accuracy in object recognition and classification and the inference speed according to an embodiment of the present invention, and FIG. 5 is an exemplary view illustrating a more detailed configuration of the object inference module shown in FIG. 1.

Referring to FIG. 4, a background line corresponding to a boundary formed by buildings and trees on the ground is formed on a lower side of an image, and an object (e.g., a UAV) of a very small size compared to the size of the image is shown in a sky space, which is an upper side of the image.

Therefore, as described above, when the entire original image is reduced and input to the machine learning inference model 205, the size of the object (e.g., the UAV) is further reduced to a level at which the type of the object cannot be classified, and thus the accuracy of object recognition and classification is further lowered.

Therefore, the object inference module 102 of the present embodiment is implemented to input an image 305 in which only a region including an object is extracted into a machine learning model (or a machine learning inference model) rather than reducing the size of the entire image such that, through an object classification processor 102a and an object prediction processor 102b (see FIG. 5), the size of an object relative to an image (i.e., the image in which only the region including the object is extracted) input to the machine learning model (or the machine learning inference model) is enlarged, thereby providing a method of improving the accuracy of object recognition and classification compared to a method of reducing the entire image according to the size of a machine learning model (or a machine learning inference model).

Meanwhile, the object classification processor 102a and the object prediction processor 102b may be integrated into one processor and included in the object inference module 102.

Figure 6:
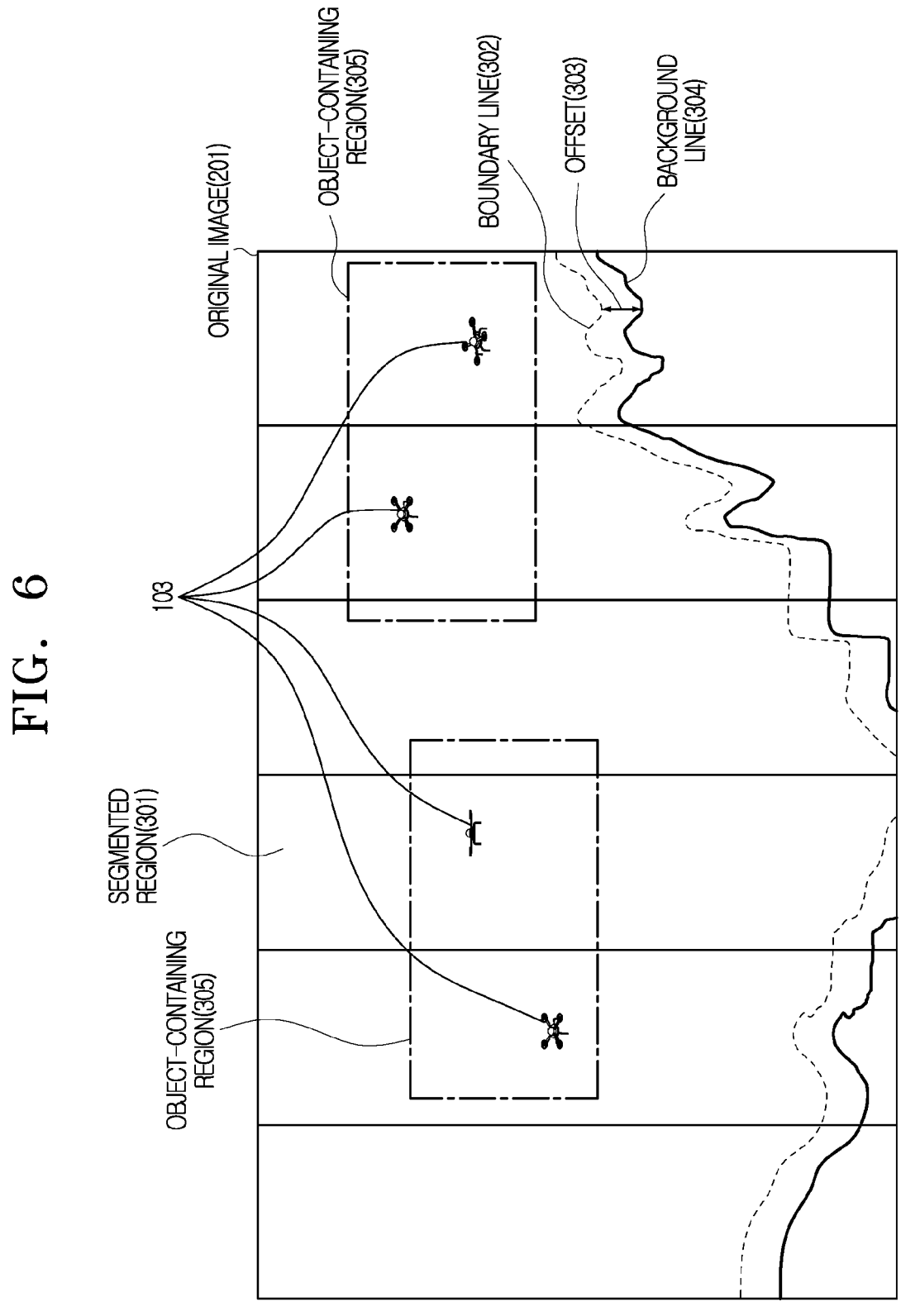
FIG. 6 is an exemplary view for describing a method by which the object inference module shown in FIG. 1 extracts an object-containing region from an original image.

FIG. 6 is an exemplary view for describing a method of extracting an object-containing region from an original image by the object inference module shown in FIG. 1.

Referring to FIG. 6, the object inference module 102 divides an original image 201 in the horizontal direction into a designated number N of regions. Hereinafter, the regions divided into the designated number N in the horizontal direction are referred to as segmented regions 301.

The object inference module 102 searches for an object 103 present in each of the segmented regions 301 of the original image 201, calculates an object-containing region 305 including one or more objects 103, and inputs image information of the object-containing region 305 to the machine learning inference model 205. That is, the object inference module 102 according to the present embodiment calculates an object-containing region 305 obtained by clustering objects found in the original image 201, and inputs image information of the object-containing region 305, rather than the original image 201 (i.e., the entire image), to the machine learning inference model 205.

Accordingly, the machine learning inference model 205 receives the image information of the object-containing region 305 as an input and calculates a final classification result.

Meanwhile, in the original image 201 shown in FIG. 6, a background line 304 represents an actual boundary between ground objects, such as buildings, trees or the like, and the sky space in the entire image, and a boundary line 302 represents a line formed by adding an offset 303 of a predetermined interval toward an upper side (that is, the sky space) from the background line 304.

In this case, the reason for setting the boundary line 302 is to exclude a region below the boundary line 302 from an object search range.

In other words, the reason for setting the boundary line 302 is to compensate for errors that may occur in estimating the background line 304. For example, this is to reduce an error of mistaking a non-object for an object in a region adjacent the background line 304 (e.g., the possibility of a tree branch extending into the sky space being mistaken for an object).

Hereinafter, a method of detecting the background line 304 and the boundary line 302 will be described.

Figure 7:
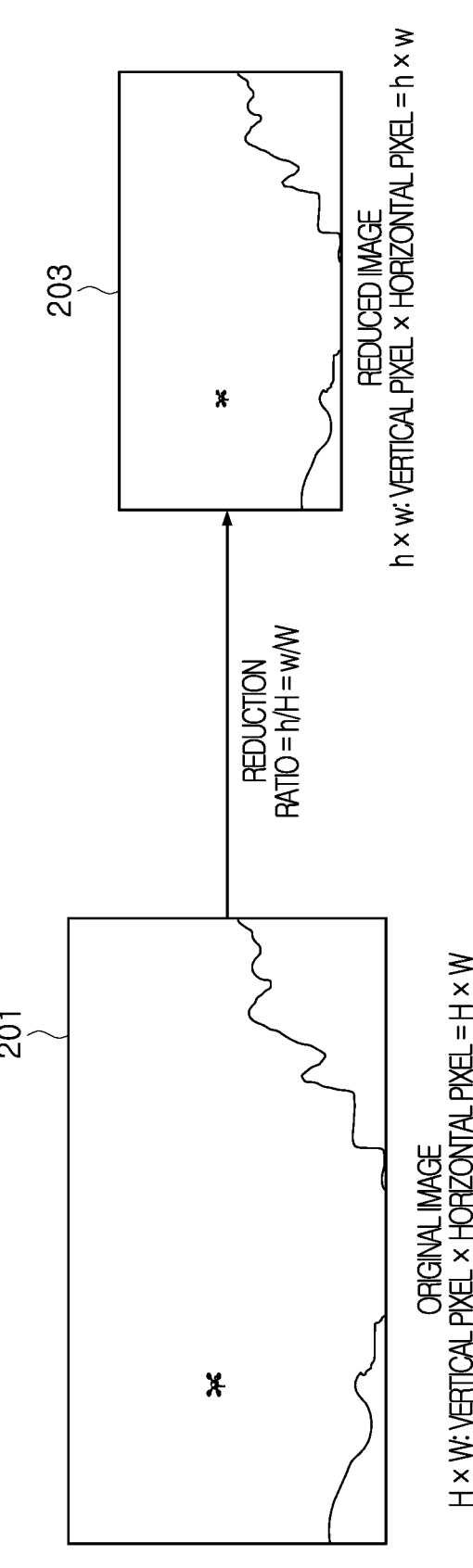
FIG. 7 is an exemplary view for describing the principle of detecting a background line in an original image shown in FIG. 6.

FIG. 7 is an exemplary view for describing the principle of detecting a background line in an original image shown in FIG. 6.

Referring to FIG. 7, in order to detect a background line 304 in the original image 201, the object inference module 102 reduces the original image 201 to the reduced image 203 at a designated ratio.

The reason for reducing the original image 201 to the reduced image 203 as described above is to reduce the load of calculation (i.e., calculation for detecting the background line).

That is, the detection of the background line 304 requires calculation in units of pixels, and after detecting the background line 304 using the reduced image 203, the calculation load in a process of restoring (or returning) the location of an object in the original image 201 from the location of the object in the reduced image 203 may be reduced.

For example, in order for the object inference module 102 to detect the background line 304 in the original image 201, it may be assumed that the original image 201 (e.g., vertical pixels×horizontal pixels=H×W) is reduced at a designated ratio (RATIO=h/H=w/W) to generate a reduced image 203 (e.g., vertical pixels×horizontal pixels=h×w). In this case, when a certain object in the reduced image 203 has a location (i.e., coordinates) of (cx, cy) and the location (i.e., coordinates) of the object in the reduced image 203 is returned to the location of the object in the original image 201, a location of the object in the original image 201 is (cx/RATIO, cy/RATIO).

Figure 8:
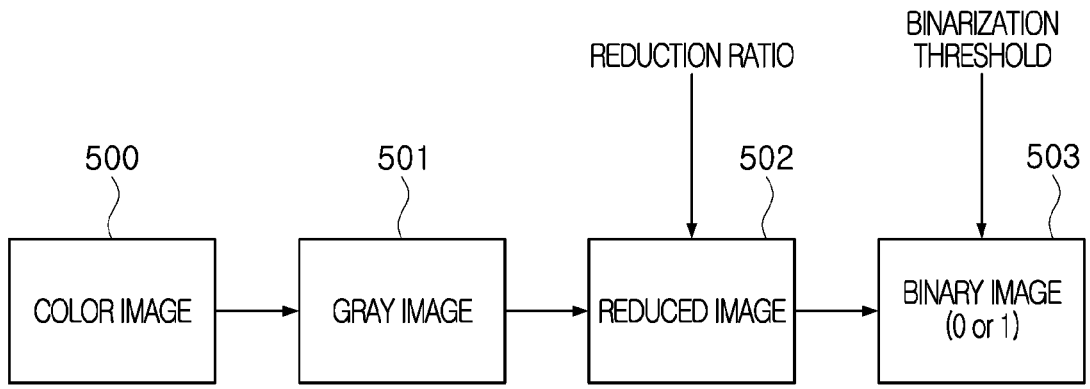
FIG. 8 is an exemplary view for describing an image binary-coding method as an operation before detecting a background line in the original image shown in FIG. 7.

FIG. 8 is an exemplary view for describing an image binary-coding method as an operation before detecting a background line in an original image shown in FIG. 7.

Referring to FIG. 8, the object inference module 102 converts a color image 500 into a gray image 501 having the same R, G, and B values.

Thereafter, the object inference module 102 reduces the gray image 501 at a designated ratio (e.g., a reduction RATIO) to generate a reduced image 502, and then generates a binary image 503 from the reduced image 502.

Here, the binary image 503 is an image in which pixel values are expressed as 0 or 1, and may be calculated according to Expression 1 below.

That is, referring to Expression 1, a pixel value of the reduced image 502 greater than or equal to a designated threshold value THRESHOLD is expressed as 1, and a pixel value smaller than the designated threshold value THRESHOLD is expressed as 0. In this case, the threshold value THRESHOLD may be set in plural.

$$\text{pixel } (i, j) = \begin{cases} 1 & \text{if pixel\_value} \geq \text{THRESHOLD} \\ 0 & \text{else} \end{cases} \quad \text{[Expression 1]}$$

Figure 9:
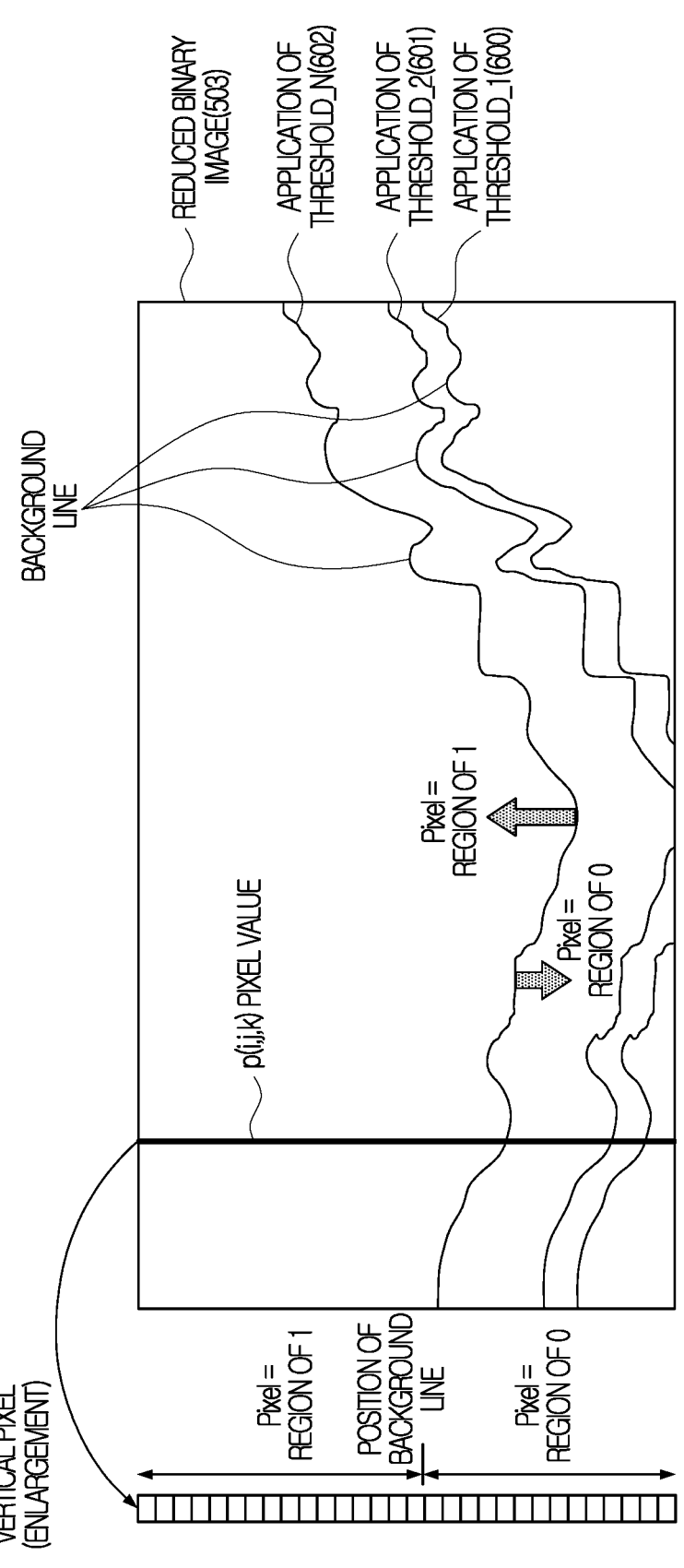
FIG. 9 is an exemplary view for describing a method of calculating a background line from a reduced binary image in FIG. 8.

FIG. 9 is an exemplary view for describing a method of calculating a background line from a reduced binary image in FIG. 8.

The object inference module 102 uses a first threshold value THRESHOLD_1 600 to calculate a first background line, and uses a second threshold value THRESHOLD_2 601 to calculate a second background line. Similarly, the object inference module 102 uses an $N^{th}$ threshold THRESHOLD_N 602 to calculate an $N^{th}$ background line (see Expression 2).

The reason for calculating the plurality of background lines as described above is to detect the optimal background line among the background lines (see Expression 3).

For reference, weights $W_k$ used to calculate the N background lines include different weights, and the sum of the weights $W_k$ is 1 (see Expression 3).

That is, referring to an enlarged image of vertical pixels shown in FIG. 9, the position of the background line is calculated by adding the values of the corresponding vertical pixels, and is expressed as Expression 2.

For example, when $L_i$ is concatenated in Expression 2, a background line at the first threshold value THRESHOLD_1, a background line at the second threshold value THRESHOLD_2, and a background line at the $N^{th}$ threshold value THRESHOLD_N are calculated, the final background line (i.e., the optimal background line) among the plurality of background lines is calculated by obtaining a weighted average of the values from the first threshold value to the $N^{th}$ threshold value (THRESHOLD_1 to THRESHOLD_N), and is expressed by Expression 3 below.

That is, in FIG. 9, the final background line (304 in FIG. 6) with respect to a horizontal pixel i is $B_i$ as shown in Expression 3 below.

Expression 4 below represents $C_i$, which is the final boundary line 302 having an interval corresponding to an OFFSET from the background line 304.

$$L_{i,k} = \sum_{j=0}^{h-1} p(i, j, k),$$ [Expression 2]

$i, j$ = horizontal, vertical pixel index, $k$ = THRESHOLD_k $$B_i = \sum_{k=0}^{N} w_k L_{i,k}, \quad \sum_{k=0}^{N} w_k = 1$$ [Expression 3]

$$C_i = B_i - \text{OFFSET}$$ [Expression 4]

FIG. 10 is an exemplary view for describing a method of detecting an object in the reduced binary image in FIG. 8.

Referring to FIG. 10, the object inference module 102 applies an object line calculation threshold THRESH-OLD_O designated for object detection in the reduced binary image 503 to Expression 5 below, to detect (calculate) an object line 703.

That is, Expression 5 below is for searching for a first vertical pixel index $OBJ_{i,O}$ at which a vertical pixel value with respect to a horizontal pixel i is the minimum in the reduced binary image 503, to which the object line calculation threshold THRESHOLD_O is applied. Accordingly, as shown in FIG. 10, the object line 703 is generated with a line that contacts the boundary line 302 at a place (a location) in which there is no object and with a straight line that is perpendicular to the boundary line 302 at a place (a location) in which there is an object.

As a result, as shown in FIG. 10, the object line 703 is generated in a form that, with respect to all horizontal pixels, protrudes at a place (a location) in which there is an object (at a protrusion height that varies depending on the location of the object), and follows the boundary line 302 at a place (a location) in which there is no object.

$$OBJ_{i,O} = \text{argmin}_j \{ p(i,j,O) \},$$

$i,j$=horizontal,vertical pixel index, $O$=THRESHOLD_O [Expression 5]

Figure 11:
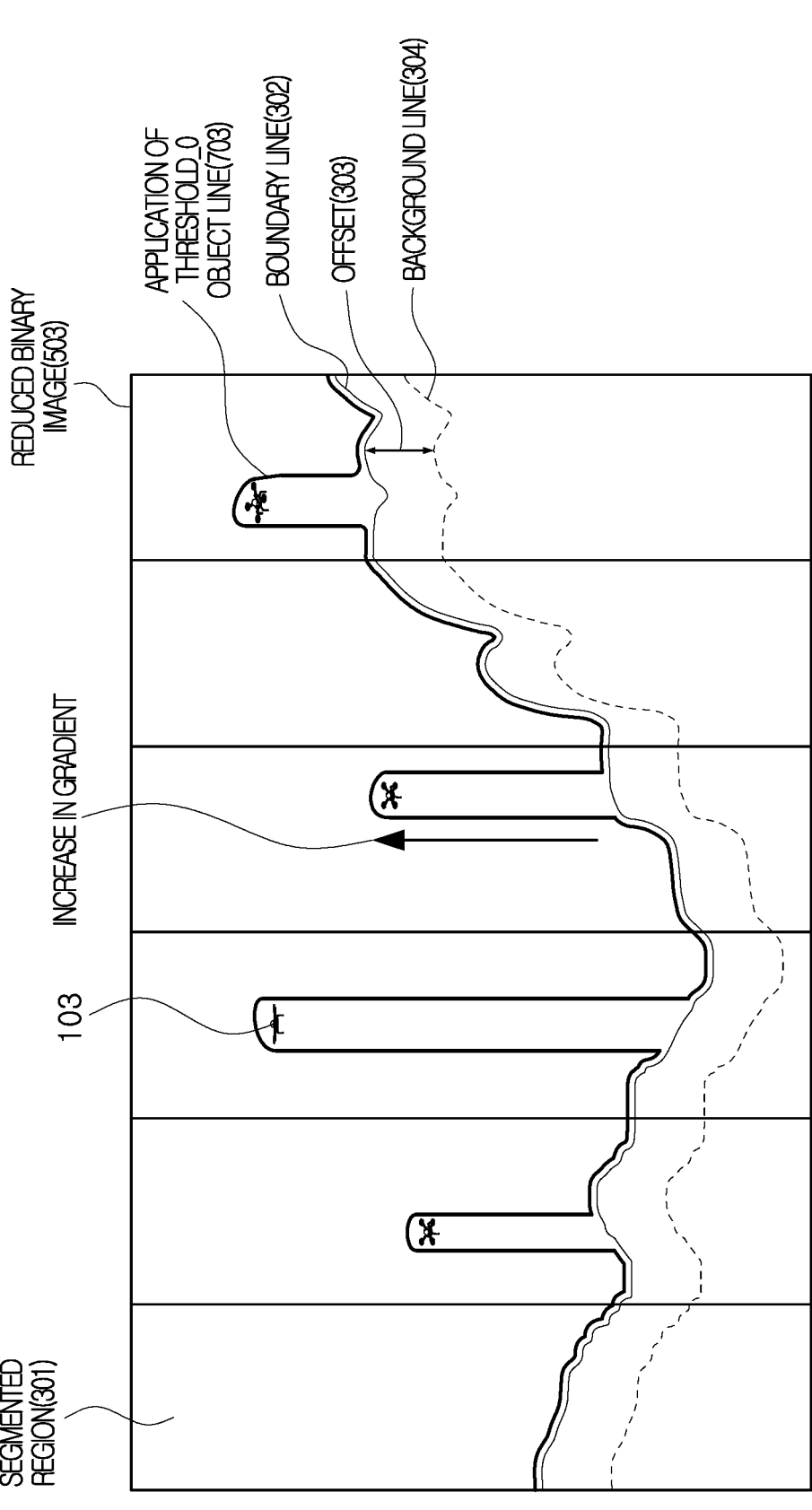
FIG. 11 is an exemplary view for describing a method of detecting an object using segmented regions in the reduced binary image in FIG. 8.

FIG. 11 is an exemplary view for describing a method of detecting an object using segmented regions in the reduced binary image in FIG. 8.

Referring to FIG. 11, the object inference module 102 detects at least one object 103 in each of the plurality of segmented regions 301.

In this case, in proportion to the increasing number of the segmented regions 301, the width of a single segmented region 301 becomes narrower, and the possibility of two or more objects 103 being present in a single segmented region 301 gradually decreases.

Therefore, by detecting objects in the plurality of segmented regions 301 independently (or in a parallel manner), the overall inference time may be shortened.

Hereinafter, a process of detecting a single object 103 in each of the segmented regions 301 will be described in more detail.

For example, an example of a condition for determining that a point of the object line 703 is an object 103 within each of the segmented regions 301 is a case when an increase in the object line 703 becomes greater than a designated object detection threshold value THRESHOLD_OBJECT.

For example, assuming that the object line 703 is a function, as shown in Expression 6 below, a point (x, y) having a y value (i.e., a vertical pixel position value) satisfying a case "dy/dx>THRESHOLD_OBJECT" is determined as a location in which the object 103 is present. That is, a point in which the gradient maximally increases is determined as a point in which an object is located.

However, the above description is not intended to limit the method of detecting an object in the segmented region 301, and may be applied when detecting an object in the entire image without segmenting regions.

$(x,y)$subject to $dy/dx$>THRESHOLD_OBJECT [Expression 6]

On the other hand, when the locations of objects are detected in the reduced binary image 503 as described above, the object-containing regions 305 are clustered (i.e., objects are combined to be included in object-containing regions) according to the size that is inputtable to the machine learning model (or the machine learning inference model), and the clustered object-containing regions 305 are restored (returned) to the original image 201.

In this case, by minimizing the number of object-containing regions to be calculated (or generated), the object inference time may be reduced.

For example, referring to FIG. 12, according to the clustering method, when object-containing regions 305 each including a single object are generated, up to four object-containing regions 305 are generated, and when object-containing regions 305 each including two objects are generated, two object-containing regions 305 are generated.

When an object-containing region 305 including all four objects is generated, the object-containing region 305 exceeds a size that is inputtable to the machine learning model (or the machine learning inference model). Accordingly, a cluster 906 with two object-containing regions 305 may be provided as in FIG. 12 (907: location of the object).

Hereinafter, a method of clustering object-containing regions will be described.

FIG. 12 is an exemplary view for describing a method of clustering object-containing regions in the reduced binary image shown in FIG. 11.

Referring to FIG. 12, when the total number of objects is F, a clustering is performed such that the number of objects included in an object-containing region 305 is maximized with a combination using a designated clustering function $_FC_f$ (i.e., f=F, F−1, . . . , and 1). That is, starting from f=F, the remaining clusterings are performed while excluding clustered objects.

The above process is performed with a clustering including a larger number of objects being performed first.

Meanwhile, an object-containing region 305 ((cx, cy), (cx+w, cy+h)) 305 in the reduced binary image 503 shown in FIG. 12 may be mapped to an object-containing region (((cx, cy), (cx+w, cy+h))×RATIO) in the original image 201 by applying a designated ratio RATIO to the object-containing region 305 ((cx, cy), (cx+w, cy+h)) in the reduced binary image 503 as shown in Expression 7 below.

$((cx,cy),(cx+w,cy+h))$→$((cx,cy),(cx+w,cy+h))$×RATIO [Expression 7]

Figure 13:
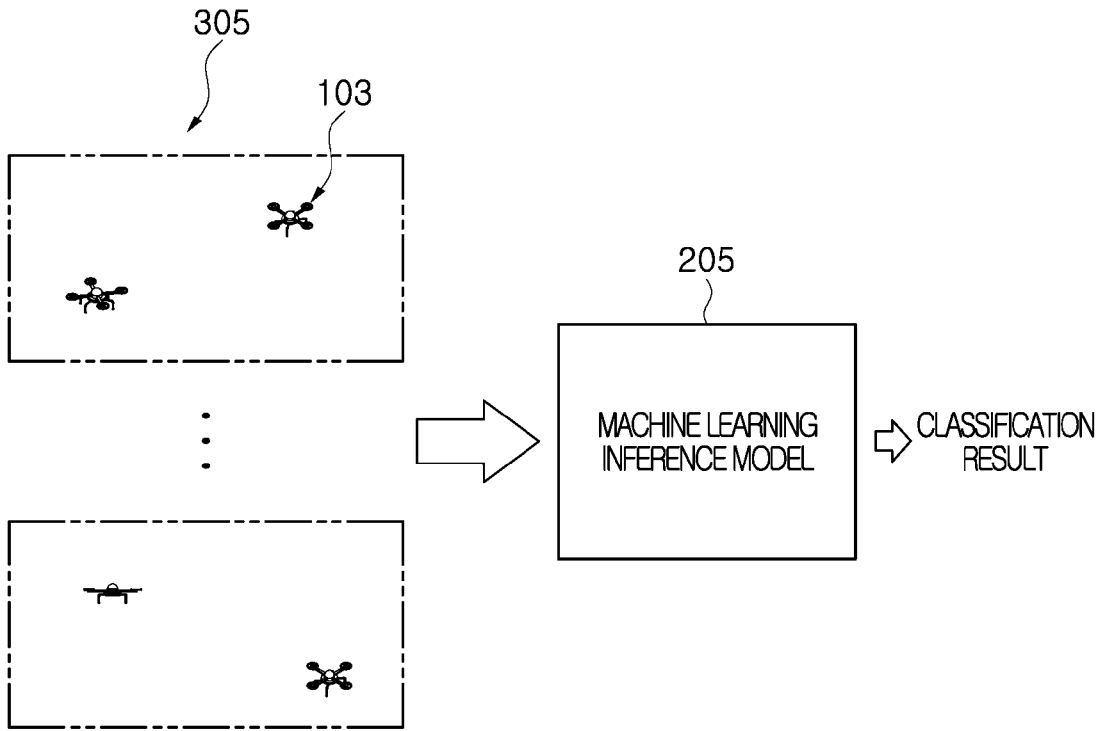
FIG. 13 is an exemplary view for describing a process of calculating an object-containing region from an original image and inputting the object-containing region to a machine learning inference model in FIG. 6.

FIG. 13 is an exemplary view for describing a process of calculating an object-containing region from an original image and inputting the object-containing region to the machine learning inference model in FIG. 6.

As described with reference to FIG. 12, when the object-containing region (((cx, cy), (cx+w, cy+h))×RATIO) in the original image 201 is calculated (extracted) using the object-containing region 305 ((cx, cy), (cx+w, cy+h)) 305 in the reduced binary image 503, the calculated (extracted) object-containing region (((cx, cy), (cx+w, cy+h))×RATIO) in the original image 201 may be input to the machine learning inference model 205 so that a final result is calculated.

As described above, in the present embodiment, rather than simply reducing the entire original image 201 and inputting the reduced original image to the machine learning inference model 205, one or more object-containing regions 305 are calculated from the original image 201 and input to the machine learning inference model 205, thereby improving inference accuracy and inference speed for object recognition and classification.

In addition, the present embodiment may be directly used as an input method of a machine learning inference model for detecting an object (e.g., a UAV) appearing in the sky space and identifying the type of the object, may have excellent inference performance particularly in high-resolution (e.g., 4K, FHD) images, and may be directly applied to a system for tracking a physical location of an inferred object.

Although the present invention has been described with reference to the embodiments illustrated in the drawings, the embodiments disclosed above should be construed as being illustrative rather than limiting the present invention, and those skilled in the art should appreciate that various substitutions, modifications, and changes are possible without departing from the scope and spirit of the present invention. Therefore, the scope of the present invention is defined by the appended claims of the present invention. The implementations described herein may be implemented in, for example, a method or process, an apparatus, a software program, a data stream, or a signal. Even when only discussed in the context of a single form of implementation (for example, discussed only as a method), the implementation of features discussed may also be implemented in other forms (for example, an apparatus or program). An apparatus may also be implemented in appropriate hardware, software, and firmware. The methods may be implemented in, for example, an apparatus such as a processor, which is a general term for a processing device, such as a computer, a microprocessor, an integrated circuit, or a programmable logic device. Processors also include communication devices such as computers, cellular phones, portable/personal digital assistants (PDAs), and other devices that facilitate communication of information between end-users.

What is claimed is:

1. An apparatus for recognizing an object, the apparatus comprising:

at least one processor; and a memory storing instructions, which, when executed by the at least one processor, cause the at least one processor to implement:

an object inference module configured to process an original image captured by a camera module and generate an image of a size to be input to a machine learning inference model, wherein the object inference module includes the machine learning inference model, and outputs a result of recognition and classification of an object inferred through the machine learning inference model, and wherein the object inference module is configured to, prior to processing by the machine learning inference model:

generate a reduced binary image from the original image;

calculate a background line representing a boundary between a ground region and a sky space based on pixel values of the reduced binary image; and extract at least one object-containing region from the sky space based on the background line, wherein the machine learning inference model processes the extracted object-containing region to infer the object included in the extracted object-containing region.

2. The apparatus of claim 1, wherein the object inference module is configured to extract, as the image to be input to the machine learning inference model, an image including a plurality of object-containing regions clustered from the original image according to the size to be input to the machine learning inference model.

3. The apparatus of claim 2, wherein the object interference module is configured to:

in order to extract the object-containing region, calculate the background line from the reduced binary image obtained by reducing the original image;

add an offset toward the sky space above the background line to calculate a boundary line; and extract the object-containing region only from the sky space except for excluding a region below the boundary line.

4. The apparatus of claim 3, wherein the object inference module is configured to:

convert a color image, which is the original image, into a gray image in which R, G, and B values are the same; and reduce the gray image to generate a reduced binary image, wherein the binary image is an image in which a pixel value greater than or equal to a designated threshold value is represented as 1 and a pixel value smaller than the designated threshold value is represented as 0.

5. The apparatus of claim 3, wherein the object inference module is configured to use different threshold values to calculate N background lines, and obtain a weighting average of the N background lines assigned different weights ($W_k$) to calculate a final background line ($B_i$).

6. The apparatus of claim 3, wherein the object inference module is configured to:

calculate an object line for detecting an object in the reduced binary image; and repeatedly perform a process of searching for a first vertical pixel index ($OBJ_{i,O}$) at which a vertical pixel value with respect to a horizontal pixel (i) of the binary image is minimum based on an object line calculation threshold (THRESHOLD_O) designated to calculate the object line so as to detect the object line.

7. The apparatus of claim 6, wherein the object inference module is configured to independently detect objects in a plurality of segmented regions obtained by dividing the reduced binary image in a horizontal direction, wherein a point at which a gradient of the object line maximally increases beyond an object detection threshold (THRESHOLD_OBJECT) is detected as a location of an object.

8. The apparatus of claim 7, wherein the object inference module is configured to, upon the locations of the objects being detected in the reduced binary image, cluster object-containing regions according to the size to be input to the machine learning inference model, wherein the clustering is performed with a smallest number of combinations of the object-containing regions in the corresponding image.

9. The apparatus of claim 8, wherein the object inference module is configured to apply a specified ratio to the object-containing region clustered in the reduced binary image so as to map the clustered object-containing region to an object-containing region of the original image.

10. A method of recognizing an object, the method comprising:

receiving, by an object inference module, an original image captured by a camera module;

processing, by the object inference module, the original image, the processing comprising:

generating a reduced binary image from the original image, calculating a background line representing a boundary between a ground region and a sky space based on pixel values of the reduced binary image, and extracting at least one object-containing region from the sky space based on the background line; and processing, by a machine learning inference model, the extracted object-containing region to perform recognition and classification of an object included in the extracted object-containing region, and outputting a result of the recognition and classification of the object.

11. The method of claim 10, wherein the extracting of the at least one object-containing region comprises:

detecting, by the object inference module, at least one object based on pixel values of the reduced binary image prior to processing by the machine learning inference model;

clustering, by the object inference module, at least one object-containing region based on locations at which the at least one object is detected; and mapping, by the object inference module, the object-containing region clustered in the reduced binary image to corresponding object-containing regions in the original image, to obtain the at least one object-containing region that is to be input to the machine learning inference model.

12. The method of claim 11, wherein the detecting of the at least one object based on pixel values of the reduced binary image comprises:

calculating, by the object interference module, the background line from the reduced binary image;

adding an offset toward the sky space above the background line to calculate a boundary line; and detecting the at least one object only from the sky space above the boundary line.

13. The method of claim 11, wherein the detecting of the at least one object further comprises:

dividing the reduced binary image into a plurality of segmented regions in a horizontal direction; and independently detecting objects from the plurality of segmented regions, thereby reducing an overall inference time.

14. A method of recognizing an object, the method comprising:

reducing, by an object inference module, an original image to generate a reduced image;

converting, by the object inference module, the reduced image into a binary image to generate a reduced binary image;

detecting, by the object inference module, an object in the reduced binary image based on pixel values of the reduced binary image prior to processing by a machine learning inference model, and detecting a location of the object based on the reduced binary image;

clustering, by the object inference module, object-containing regions in the reduced binary image based on the detected location of the object;

mapping, by the object inference module, the object-containing regions clustered in the reduced binary image to corresponding object-containing regions in the original image; and inputting, by the object inference module, the object-containing regions mapped to the original image to the machine learning inference model for object recognition.

15. The method of claim 14, wherein the detecting of the object comprises:

calculating, by the object interference module, a background line from the reduced binary image;

adding an offset toward a sky space above the background line to calculate a boundary line; and detecting the object only from the sky space above the boundary line.

16. The method of claim 14, wherein the generating of the reduced binary image includes:

converting, by the object inference module, a color image, which is the original image, into a gray image in which R, G, and B values are the same, and reducing the gray image to generate a reduced image; and representing, by the object inference module, 0 when a pixel value is greater than or equal to a designated threshold value and representing 1 when a pixel value is smaller than the designated threshold value, to generate the reduced binary image.

17. The method of claim 15, wherein the calculating of the background line comprises:

using, by the object inference module, different threshold values to calculate N background lines; and obtaining a weighting average of the N background lines assigned different weights ($W_k$) to calculate a final background line ($B_i$).

18. The method of claim 14, wherein the detecting of the object and the detecting of the location of the object comprise:

calculating, by the object inference module, an object line in the reduced binary image; and detecting, by the object inference module, a location of the object as a point at which a gradient of the object line maximally increases beyond an object detection threshold (THRESHOLD_OBJECT).

19. The method of claim 18, wherein the calculating of the object line comprises repeatedly performing, by the object inference module, a process of searching for a first vertical pixel index ($OBJ_{i,O}$) at which a vertical pixel value with respect to a horizontal pixel (i) of the reduced binary image is a minimum based on a designated object line calculation threshold (THRESHOLD_O) so as to detect the object line.

20. The method of claim 14, wherein the mapping of the object-containing regions clustered in the reduced binary image to the corresponding object-containing regions in the original image includes applying, by the object inference module, a designated ratio to the object-containing regions clustered in the reduced binary image to map the clustered object-containing regions to the object-containing regions of the original image.

* * * * *